July 16, 1946. A. BECHLER 2,404,210
MOTION-TRANSMITTING LEVER FOR AUTOMATIC MACHINE TOOLS
Filed Sept. 4, 1942
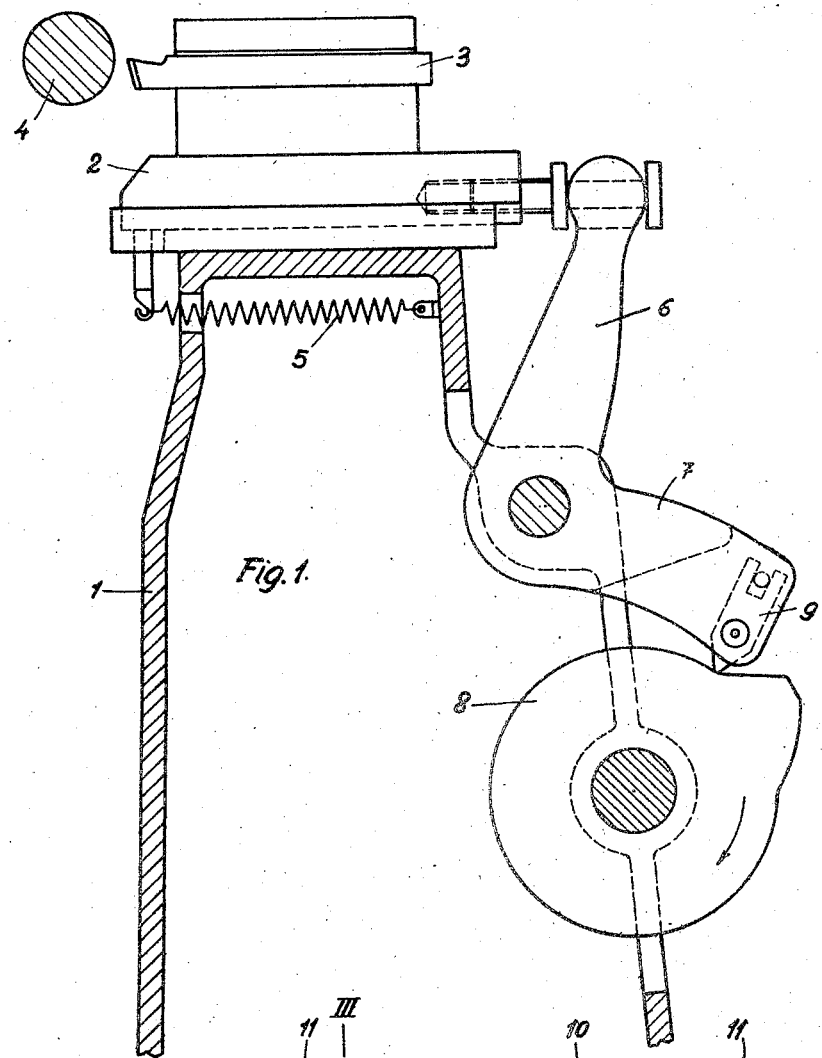
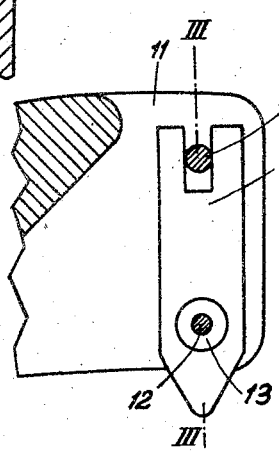
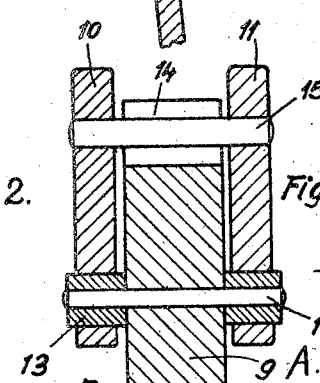
Inventor,
A. Bechler
By Young, Emery & Thompson
Attorneys Patented July 16, 1946

2,404,210

UNITED STATES PATENT OFFICE 2,404,210

MOTION-TRANSMITTING LEVER FOR AUTOMATIC MACHINE TOOLS

André Bechler, Moutier, Switzerland

Application September 4, 1942, Serial No. 457,359
In Switzerland July 4, 1940

2 Claims. (Cl. 74—569)

The present invention relates to a motion-transmitting lever for automatic machine tools.

In automatic machine tools, the movements are transmitted from the cams to the tools by levers bearing with one of their arms on the respective cam surface, while the other arm is in connection with the tool. If, therefore, the tool, when operated by the cam, is subjected to a dangerous load resulting, e. g., from a disturbance, from a collision of two tools or from blunting of the tool, all the parts intercalated between the cam and the tool are subjected to a strain for which they are not dimensioned. They either deform or break according to the material which they are made of and the machine is involuntarily put out of action for a certain time.

The present invention remedies these inconveniences. Its object is a motion-transmitting lever for automatic machine tools which, by means of a feeler, bears on a cam operating it. The fixing device of this feeler comprises a safety bolt and a guide giving the feeler full liberty to shear the safety bolt, whatever the direction of the dangerous load may be.

The safety bolt rests preferably in sleeves which, in their turn, are provided on arms of the transmission lever. This arrangement not only allows the safety bolt to be easily replaced, but also enables its shearing at a desired cross section, so that any damage of the transmission lever is avoided.

Other objects and features will be apparent as the following description proceeds, reference being had to the accompanying drawing in which Fig. 1 shows portions of an automatic lathe, partly in section, Fig. 2 is a view of the feeler, on an enlarged scale, and Fig. 3 is a section taken on line III—III of Fig. 2.

On the frame 1 of the lathe a tool-support 2 is slidably mounted. To this support a tool 3 adapted to machine the piece 4 is fixed. By means of a spring 5, the support 2 is constantly pressed against the arm 6 of a bent lever whose other arm 7, by means of a feeler 9, is in contact with the circumference of the cam disc 8. This feeler 9, shown on an enlarged scale in Figs. 2 and 3, is placed between the flanges 10 and 11 of the lever 7 and is mounted on the same by means of the safety bolt 12. This safety bolt 12 rests in the tempered sleeves 13 inserted into bores of the flanges 10 and 11, these sleeves making contact with the feeler 9 at the places where the bolt 12 comes out of the sleeves.

At the end opposite to its point the feeler 9 has a slide slot 14, a bolt 15 attached to the flanges 10 and 11 of the lever going through said slot 14 and making contact with the flanks of the latter. Thus, slide slot 14 and bolt 15 form a guide for the feeler.

The safety bolt 12 is so dimensioned that it may resist any load resulting from normal work of the machine. However, as soon as a dangerous load acts on the arm 6 of the lever, the safety bolt, in the frontal planes of the sleeve 13, is sheared, while the feeler, owing to the cooperation between the slot 14 and the bolt 15, has room to move in any direction. Whatever the direction of the shearing force dependent on the contour of the cam at the moment of the dangerous load may be, the feeler, on the safety bolt being sheared, may either move parallel to itself by sliding on the bolt 15, or may oscillate about this bolt, or perform any other movement composed of these parallel and oscillating motions.

While I have described and illustrated one embodiment of my invention I do not wish unnecessarily to limit the scope of this invention, but reserve the right to make such modifications as may come within the purview of the accompanying claims.

What I claim is:

1. Shear bolt device for use in a mechanical drive having a cam and a cam follower lever, comprising laterally spaced flanges on said lever, a hardened sleeve in each of said flanges, said sleeves being in axial alignment parallel to the axis of the cam, a cam feeler mounted between said flanges with its opposite side faces contacting the inner ends of said hardened sleeves, a shear bolt of material softer than said sleeves traversing and being in double shear between said sleeves and said cam feeler, and pin and slot guide means between said flanges and said feeler at the end of the latter remote from the cam, said guide means being operative in a line substantially radial to the cam.

2. A shear bolt device for use in a mechanical drive having a cam and a cam follower lever; comprising flanges on said lever, a first bolt and a second bolt, both fixed to said flanges said first bolt being a shear bolt, sleeves attached to said flanges and passed through by said shear bolt, a slide pin in contact with said cam and with the front face of said sleeves, said slide pin being fixed to said flanges by said shear bolt and having a longitudinal slot with its walls in contact with said second bolt and extending within the space between said shear and said second bolt.

ANDRÉ BECHLER.